United States Patent [19]

Barzuza

[11] Patent Number: 4,875,913
[45] Date of Patent: Oct. 24, 1989

[54] APPARATUS FOR CLEANING CORRUGATED FILTER ELEMENTS

[75] Inventor: Ytshak Barzuza, Petach Tikva, Israel

[73] Assignee: Filtration Water Filters For Agriculture and Industry, Ltd., Herzlin, Israel

[21] Appl. No.: 216,181

[22] Filed: Jul. 7, 1988

Related U.S. Application Data

[63] Continuation-in-part of Ser. No. 733,736, May 14, 1985, Pat. No. 4,780,151.

[51] Int. Cl.⁴ .................... B01D 46/04; B01D 29/06
[52] U.S. Cl. ........................... 55/294; 55/301; 55/521; 210/106; 210/409
[58] Field of Search ............ 55/96, 97, 282, 283, 55/294, 301, 521; 210/106, 108, 409–411, 791

[56] References Cited

U.S. PATENT DOCUMENTS

| | | | |
|---|---|---|---|
| 2,500,747 | 3/1950 | Ellis | 55/294 X |
| 2,839,158 | 6/1958 | Reinauer | 55/524 |
| 3,107,987 | 10/1963 | Duer | 55/294 |
| 3,116,990 | 1/1964 | Duer | 55/294 |
| 3,345,805 | 10/1967 | Sherrill | 55/271 |
| 3,360,907 | 1/1968 | Clark, Jr. et al. | 55/283 |
| 3,423,905 | 1/1969 | Chambers | 55/294 |
| 3,555,785 | 1/1971 | Wooldridge et al. | 55/96 |
| 3,568,414 | 3/1971 | Spriggs et al. | 55/294 |
| 3,606,735 | 9/1971 | Baigas, Jr. | 55/273 |
| 4,045,194 | 8/1977 | Ferri | 55/290 |
| 4,193,779 | 3/1980 | Hencke | 55/290 |
| 4,203,738 | 5/1980 | Kerman | 55/294 X |
| 4,259,095 | 3/1981 | Johnson, Jr. | 55/302 |
| 4,303,423 | 12/1981 | Camplin et al. | 55/294 X |
| 4,359,330 | 11/1982 | Copley | 55/273 |
| 4,452,616 | 6/1984 | Gillingham et al. | 55/521 X |
| 4,481,021 | 11/1984 | Kinney, Jr. et al. | 55/294 X |
| 4,622,050 | 11/1986 | O'Connor | 55/283 |
| 4,780,151 | 10/1988 | Barzuza | 55/294 X |

FOREIGN PATENT DOCUMENTS

| | | | |
|---|---|---|---|
| WO80/00312 | 3/1980 | PCT Int'l Appl. | 55/294 |
| 0609003 | 2/1979 | Switzerland | 55/301 |
| 2056308 | 3/1981 | United Kingdom | 55/294 |

Primary Examiner—Robert Spitzer
Attorney, Agent, or Firm—Sandler & Greenblum

[57] ABSTRACT

A system for cleaning corrugated filter elements by means of suction nozzles comprises a suction nozzle movable relative to the surface of the element. The specific parameters of the system, such as nozzle size, spacing of the nozzle from the apices of the filter, and the height of the apices, are interrelated in accordance with a specially developed formula.

2 Claims, 1 Drawing Sheet

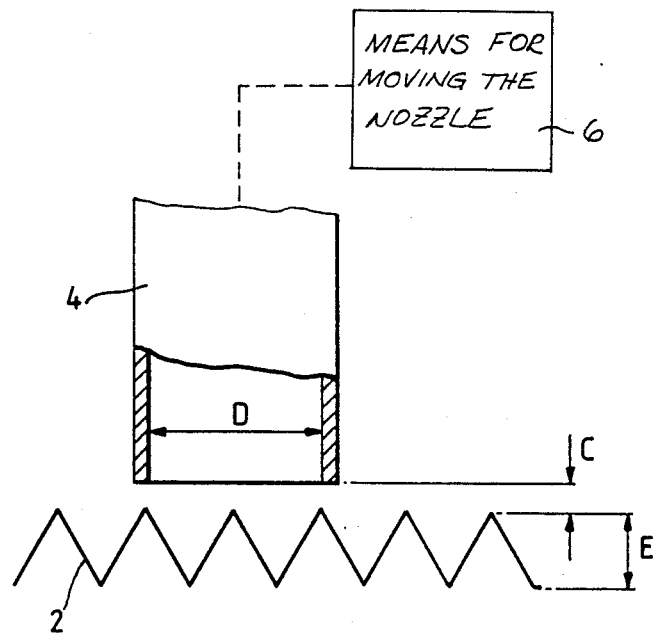

APPARATUS FOR CLEANING CORRUGATED FILTER ELEMENTS

RELATED APPLICATION

This application is a continuation-in-part of copending Application Ser. No. 733,736 filed May 14, 1985, now U.S. Pat. No. 4,780,151.

TECHNICAL FIELD

The present invention relates to apparatus for cleaning corrugated filter elements.

BACKGROUND ART

Suction nozzles for cleaning purposes have been used before, but exclusively in conjunction with smooth-surfaced, i.e., noncorrugated, filter elements, in spite of the obvious advantages offered by the corrugated elements which facilitate the accommodation, in a given filter-housing size, of a much larger filter surface. The reasons for this state of affairs is the prevailing opinion that cleaning by suction is simply not suitable for corrugated filter elements, an opinion that has taken root due to the absence, so far, of proven rules that would establish clear relationships between principal filter-element and suction-nozzle parameters which, if adhered to, would ensure efficient cleaning, by suction nozzles, also of corrugated filter elements.

It is an object of the present invention to remedy the above-described situation by establishing such a relationship as can be used in the design of filters with corrugated elements that can be efficiently cleaned by means of suction nozzles.

DISCLOSURE OF INVENTION

A system, according to the present invention, for cleaning a corrugated filter element by means of a suction nozzle comprises a suction nozzle movable relative to the surface of said element, wherein the parameters of said system are interrelated in accordance with the expression:

$$C \leq [A(k_1 - k_2 \times F \times G) - D \times E]/B$$

where

A = cross-section area of nozzle (inside)
B = circumference of nozzle (inside)
C = distance from nozzle mouth to nozzle-side apices of filter corrugations
D = maximum width of nozzle perpendicular to orientation of corrugations
E = height of corrugations $F$ = density of corrugations
= $\dfrac{\text{length of filter portion when stretched flat}}{\text{length, across the corrugations, of same portion of in corrugated state}}$ $G$ = open fraction of filter element
= $\dfrac{\text{total area of openings in element}}{\text{total filter-element surface}}$ $1.5 \leq k_1 \leq 2.5$ and $0.8 \leq k_2 \leq 1.0$

BRIEF DESCRIPTION OF DRAWINGS

The single FIGURE in the attached drawing shows, schematically, a portion of a suction nozzle in proximity to a portion of a corrugated filter element.

DETAILED DESCRIPTION

With specific reference to the drawings, it is stressed that the particulars shown are by way of example and for purposes of illustrative discussion of the present invention only and are presented in the cause of providing what is believed to be the most useful and readily understood description of the principles of the invention. In this regard, no attempt is made to show structural details of the invention in more detail then is necessary for a fundamental understanding of the invention, the description taken with the drawing making apparent to those skilled in the art how the invention may be embodied in practice.

In the drawing there are indicated some of the design parameters of a filter comprising a corrugated filter element 2 and a suction nozzle 4 which, in a per se known manner, can be made to sweep past the corrugations by the operation of means 6 for moving the nozzle.

The nozzle 4 can have any cross-section shape: round, square, rectangular, elliptical, and the like, and the geometry of the corrugations of the element 2 need not be triangular as shown, but can also be sinusoidal, square, trapezoidal, etc., and these shapes can be either sharp-edged, or rounded.

For effective cleaning capabilities, the design parameters of the system must be interrelated in accordance with the following expression:

$$C \leq [A(k_1 - k_2 \times F \times G) - D \times E]/B$$

where

A = cross-section area of nozzle (inside)
B = circumference of nozzle (inside)
C = distance from nozzle mouth to nozzle-side apices of filter corrugations
D = maximum width of nozzle perpendicular to orientation of corrugations
E = height of corrugations $F$ = density of corrugations
= $\dfrac{\text{length of filter portion when stretched flat}}{\text{length, across the corrugations, of same portion of in corrugated state}}$ $G$ = open fraction of filter-element
= $\dfrac{\text{total area of openings in element}}{\text{total filter-element surface}}$ $1.5 \leq k_1 \leq 2.5$ and $0.8 \leq k_2 \leq 1.0$ Sometimes the parameters F and G are given by the manufacturers, for instance: F=1.5:1, or G=45%. To be used in the formula, these values must be converted into decimal fractions, in this case, F=1.5, G=0.45.

The above expression, $k_1=1.5$ and $k_2=0.9$ thus gives the largest corrugation height E of an element of a given corrugation density F and open fraction G that is still cleanable by a given nozzle.

The expression is based on an experimentally verified assumption according to which $$A \times F \times G \leq A - (E \times D + B \times C)$$

in which $A \times F \times G$ represents the water quantity which has to pass through the piece of filter element located at any instant opposite the nozzle, for this piece to be effectively cleaned; A represents the water quantity flowing through the nozzle under given pressure conditions, and $(E \times D + B \times C)$ represent the water quantity able to take the "easy way", i.e., able to reach the suction nozzle without having been drawn through the piece of filter element opposite the nozzle, and is therefore "lost" to the cleaning process.

$k_1 = 1.5$ and $k_2 = 0.9$ in the full expression are safety factors.

For round nozzles, the expression according to the invention can be simplified to read $$E \leq \pi\{[D(k_1 - k_2 FG)]/4 - C\}$$

as with such nozzles A and B are functions of D which here stands also for the nozzle diameter.

The expression according to the invention is applicable to all filter-element configurations, both flat and cylindrical. With the latter, the corrugations may extend either in the axial direction or in radial planes, Chinese-lantern-like.

The advantages and improved results furnished by the method and apparatus of the present invention are apparent from the foregoing description of the preferred embodiment of the invention. Various changes and modifications may be made without departing from the spirit and scope of the invention as described in the claims that follow.

I claim:
1. Apparatus comprising:
   (a) a corrugated filter element having apices of height E, a corrugated density F, and an open filter fraction G;
   (b) a suction nozzle having an inside cross-sectional area A, an inside circumference B, and a maximum width D in a direction perpendicular to the orientations of the corrugations;
   (c) means for moving the nozzle over the filter element while maintaining the nozzle a distance C above the apices of said filter elements, wherein:

$$C \leq [A(k_1 - k_2)F \times G) - D \times E]/B$$

where:

$$F = \frac{\text{length of filter portion when stretched flat}}{\text{length, across corrugations, of same portion in corrugated state}}$$

$$G = \frac{\text{total area of openings in element}}{\text{total filter element surface}}$$

$1.5 \leq k_1 \leq 2.5$ and $0.8 \leq k_2 \leq 1.0$.
2. Apparatus according to claim 1 wherein: $k_1 = 1.5$ and $k_2 = 0.09$.

* * * * *